US008639896B2

(12) United States Patent
Bank et al.

(10) Patent No.: US 8,639,896 B2
(45) Date of Patent: Jan. 28, 2014

(54) LOCATING AND ALTERING SENSITIVE INFORMATION IN CORE DUMPS

(75) Inventors: Judith H. Bank, Morrisville, NC (US);
Tamera L. Davis, Raleigh, NC (US);
Julie H. King, Raleigh, NC (US);
Kaylee M. Thomsen, Durham, NC (US); Yuping Connie Wu, Cary, NC (US); Xinyi Xu, Grand Rapids, MI (US);
Chunhui Yang, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 2321 days.

(21) Appl. No.: 11/497,983

(22) Filed: Aug. 2, 2006

(65) Prior Publication Data

US 2008/0126301 A1    May 29, 2008

(51) Int. Cl.
*G06F 13/00* (2006.01)

(52) U.S. Cl.
USPC ......................................................... 711/162

(58) Field of Classification Search
None
See application file for complete search history.

(56) References Cited

U.S. PATENT DOCUMENTS

| | | | |
|---|---|---|---|
| 6,671,687 B1 | 12/2003 | Pederson et al. | |
| 7,028,056 B1 * | 4/2006 | Hendel et al. | 707/202 |
| 7,058,768 B2 * | 6/2006 | Willman et al. | 711/154 |
| 2002/0129245 A1 | 9/2002 | Cassagnol et al. | |
| 2003/0033349 A1 * | 2/2003 | Lambert et al. | 709/201 |
| 2004/0139317 A1 | 7/2004 | Fronberg | |
| 2004/0181670 A1 | 9/2004 | Thune et al. | |
| 2004/0186961 A1 | 9/2004 | Kimura et al. | |
| 2005/0120162 A1 * | 6/2005 | Sivaram | 711/101 |
| 2005/0144412 A1 | 6/2005 | Swafford et al. | |
| 2005/0204282 A1 | 9/2005 | Harutunian et al. | |
| 2005/0210077 A1 | 9/2005 | Balakrishnan et al. | |

OTHER PUBLICATIONS

Pete Broadwell, et al.; Scrash: A System for Generating Secure Crash Information; Proceedings of the 12th USENIX Security Symposium, Aug. 4-8, 2003; pp. 273-284; The USENIX Association; Berkeley CA.

* cited by examiner

*Primary Examiner* — Duc Doan
(74) *Attorney, Agent, or Firm* — Stevens & Showalter LLP

(57) ABSTRACT

A core dump is processed to locate and optionally alter sensitive information. A core dump copy is created from at least a portion of an original core dump. Also, at least one input parameter is provided that corresponds to select information to be identified in the core dump copy and address information associated with the core dump copy is defined that corresponds to at least one of addresses where the select information can be altered and addresses where the select information should not be altered. Each occurrence of the select information located within the core dump copy is identified and optionally replaced with predetermined replacement data if the occurrence of the select information is within the addresses where the select information can be altered.

51 Claims, 10 Drawing Sheets

| Offset Dec | Hex | | Len | | eye-catcher |
|---|---|---|---|---|---|
| 0 | (0) | X'C4D9' | 0 | PRDIDCV | "C'DR',2,C'C' " Dump record prefix eye-catcher |
| 2 | (2) | CHARACTER | 1 | PRDIDV | Dump record prefix version |
| 2 | (2) | X'F1' | 0 | PRDIDV31 | "C'1',1,C'C'" 31-bit support levels |
| 2 | (2) | X'F2' | 0 | PRDIDV64 | "C'2',1,C'C'" 64-bit support levels |
| 3 | (3) | ADDRESS | 1 | PRDLEN | Dump record prefix length |
| 4 | (4) | SIGNED | 4 | (0) | Align on word boundary |
| 4 | (4) | CHARACTER | 16 | PRDAS (0) | IPCS address space descriptor |
| 4 | (4) | CHARACTER | 1 | PRDAS0 (0) | Begin BLSRDATS #MD03009 |
| 4 | (4) | CHARACTER | 2 | PRDAST (0) | Address space type code |
| 4 | (4) | ADDRESS | 2 | | Address space type code |
| 4 | (4) | X'C1A0' | 0 | ZZZASTA | "C'A '" ABSOLUTE |
| 4 | (4) | X'C2D3' | 0 | ZZZASTBL | "C'BL'" BLOCK |
| 4 | (4) | X'C2E2' | 0 | ZZZASTBS | "C'BS'" RBA |
| 4 | (4) | X'C2E3' | 0 | ZZZASTBT | "C'BT'" TTR |
| 4 | (4) | X'C340' | 0 | ZZZASTC | "C'C '" CPU STATUS |
| 4 | (4) | X'C3C5' | 0 | ZZZASTCE | "C'CE'" CPU DOMAIN(VECTOR) |
| 4 | (4) | X'C3D9' | 0 | ZZZASTCR | "C'CR'" CPU REAL |
| 4 | (4) | X'C3E3' | 0 | ZZZASTCT | "C'CT'" CPU DOMAIN(CPUTRACE) |
| 4 | (4) | X'C3E5' | 0 | ZZZASTCV | "C'CV'" CPU ASID |
| 4 | (4) | X'C4E2' | 0 | ZZZASTDS | "C'DS'" ASID DSPNAME |
| 4 | (4) | X'C840' | 0 | ZZZASTH | "C'H '" HEADER |
| 4 | (4) | X'D3C9' | 0 | ZZZASTLI | "C'LI'" LITERAL |
| 4 | (4) | X'4040' | 0 | ZZZASTNO | "C' '" No address space type code |
| 4 | (4) | X'E2C2' | 0 | ZZZASTSB | "C'SB'" DOMAIN(SDUMPBUFFER) |
| 4 | (4) | X'E2C3' | 0 | ZZZASTSC | "C'SC'" COMPDATA |
| 4 | (4) | X'E2C4' | 0 | ZZZASTSD | "C'SD'" DOMAIN(SUMDUMP) |
| 4 | (4) | X'E2E2' | 0 | ZZZASTSS | "C'SS'" ASID DSPNAME SUMDUMP |
| 4 | (4) | X'E2E5' | 0 | ZZZASTSV | "C'SV'" ASID SUMDUMP |
| 6 | (6) | BITSTRING | 2 | PRDASH | Reserved |
| 8 | (8) | SIGNED | 4 | PRDAS1 (0) | Integer 1 |
| 12 | (C) | CHARACTER | 8 | PRDASC (0) | Second qualifier |
| 12 | (C) | SIGNED | 4 | PRDAS2 (0) | Integer 2 |
| 12 | (C) | SIGNED | 4 | | Integer 2 |
| 16 | (10) | BITSTRING | 4 | PRDAS3 | Reserved |
| 20 | (14) | CHARACTER | 1 | PRDAS9 (0) | End BLSRDATS #MD03009 |
| 20 | (14) | ADDRESS | 4 | PRDLAD | Logical address |
| 24 | (18) | SIGNED | 4 | PRDSEQ | Sequence num to prevent dumps from merging |
| 28 | (1C) | SIGNED | 4 | (2) | Reserved for data common to all types of dump records |
| 36 | (24) | BITSTRING | 28 | PRDTYPD | Record type specific data |
| 64 | (40) | CHARACTER | 1 | PRD999 (0) | End BLSRDRPX #MD04169 |

FIG. 8

```
|-------------------------------------------------------------------|
| DR2 CV......................^..Ùf.............Ø..................|
| CDF4CE00FFFF000300000000010B01F80000000000000000000000000000000000|
| 49203500FFFF00020000000002B004D62000000000000000000000000000000000|
|-------------------------------------------------------------------|
```

FIG. 9

```
|-------------------------------------------------------------------------------------|
| DR2 DS.......SYSDS000......°.....Ùf..............Ø....=òè{........                  |
| CDF4CE00000000EEECEFFF00000009001F8000000000000000000080007C5C00000000               |
| 492042000000328242000000000000004D62000000000000000000000000000ED40000000000         |
|-------------------------------------------------------------------------------------|
```

LOCATING AND ALTERING SENSITIVE INFORMATION IN CORE DUMPS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to computer methods, systems and computer program products that locate and optionally alter sensitive information in core dumps.

In a conventional computer system, operating system software is responsible for managing and mediating access between application programs, system hardware and operators interacting with the system. For example, the operating system may schedule tasks, allocate processor and storage resources and provide interfaces that allow operators and application programs to interact with each other, with available hardware resources and with other system processes.

During operation, an error may occur somewhere in the system, which causes instability in the operating system. Such errors may cause an outright failure of the operating system or a failure in a component of the operating system. In order to diagnose operating system failures, many operating systems support "core dumps". A core dump typically represents a snapshot of the state of the computer system at the moment of the event that triggered the core dump. For example, an operating system may generate a core dump of the system memory upon the abnormal termination of an application program, e.g., for attempting to access a protected or restricted memory region. As another example, an error caused by a hardware device or error in the computer code of a device driver for the hardware device may cause the operating system to generate a core dump of the system memory.

A core dump may not include the history of events that lead up to the root cause of the error. If a core dump includes a trace table containing a history of significant events, such as supervisor calls (SVC calls), such information may be limited, e.g., going back in time only a few seconds. Moreover, understanding the information contained within a core dump often requires a level of expertise that is not readily available to typical operators of a corresponding operating system. As such, it is not uncommon to transmit a core dump to an expert, e.g., a software support group managed by an operating system vendor, to diagnose an error or to locate a software bug.

As the core dump represents a snapshot of memory, it is possible that the core dump will contain information that an operator may not want to divulge. Thus, system operators, including banks, credit card companies and other entities entrusted with sensitive information, are typically reluctant to send core dumps to service support teams of the operating system vendor or other third party due to the risk of disclosing sensitive information that could be used to compromise the security of the enterprise or to the individuals or entities that have entrusted sensitive information to the system operator. Due to potential security exposures of sensitive information, an operator may refuse to send the core dump to the third party, or the operator may have to recreate the problem using dummy data. Either conventional option is inefficient and time consuming.

BRIEF SUMMARY OF THE INVENTION

The present invention provides a computer implemented method, system and computer program product for scanning a core dump for sensitive information, and optionally, for altering sensitive information in a core dump, e.g., so that core dump information can be transmitted to a third party without revealing the sensitive information. At least one input parameter is provided that corresponds to select information to be identified in the core dump. For example, the input parameter may be specified as part of an input configuration file. During preprocessing, address information is defined, which is associated with relevant offsets in the core dump. Each relevant offset corresponds to an address where information in the core dump should be protected or an address where information in the core dump may be unprotected. The core dump is then searched based upon the input parameter(s) and the defined address information to determine if the select information is located in the core dump, at least in the relevant offsets corresponding to information in the core dump that may be unprotected. Also, an indication, such as a dump report, may be provided of whether the select information located in the core dump.

Further, located information may be altered, e.g., masked, concealed, erased, filtered, changed, modified, adjusted, disguised, removed or otherwise rendered non-apparent. For example, the core dump may comprise a core dump copy created from at least a portion of an original core dump. Each occurrence of the select information located within the core dump copy is altered with predetermined replacement data if the occurrence of the select information is not within a determined offset address that should be protected. The replacement data may be user-specified, e.g., as presented in an input configuration file, or the replacement data may be derived from default data.

BRIEF DESCRIPTION OF THE SEVERAL VIEWS OF THE DRAWINGS

The following detailed description of the preferred embodiments of various embodiments of the present invention can be best understood when read in conjunction with the following drawings, where like structure is indicated with like reference numerals, and in which:

FIG. 8 is an exemplary z/OS operating system core dump record header;

FIG. 9 is an exemplary z/OS operating system CV dump record header for a given address space;

FIG. 10 is an exemplary z/OS operating system DS record for a given address space.

DETAILED DESCRIPTION OF THE INVENTION

Figure 1:
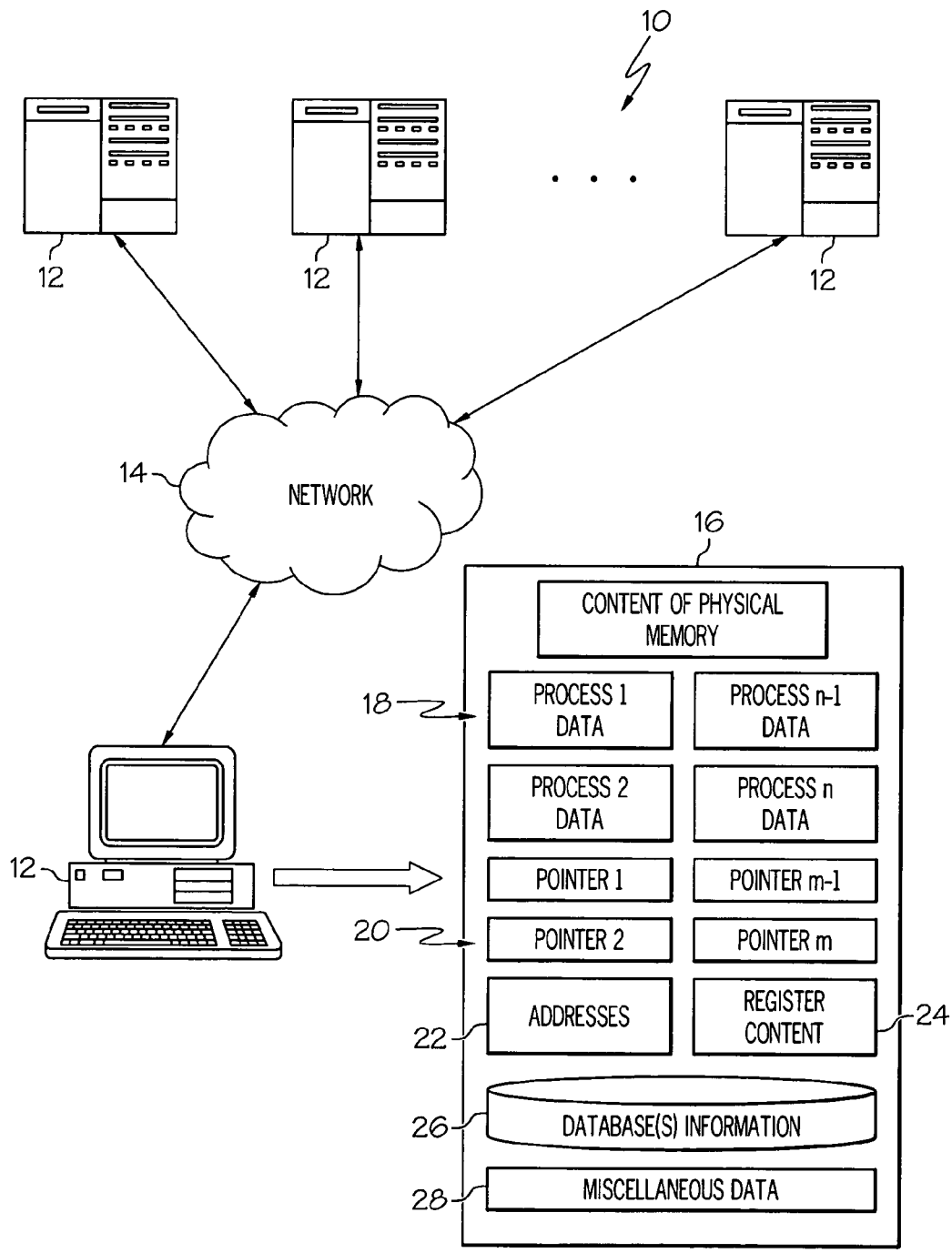
FIG. 1 is a system diagram illustrating a computer on an exemplary network that generates a core dump.

As will be appreciated by one skilled in the art, the present invention may be embodied as a computer method, a system or computer program product. Also, the present invention may take the form of an entirely hardware embodiment, an entirely software embodiment (including firmware, resident software, micro-code, etc.) or an embodiment combining software and hardware, wherein the embodiment or aspects thereof may be generally referred to herein as a "circuit," "module" or "system." Furthermore, the present invention may take the form of a computer program product on a computer-usable storage medium having computer-usable program code embodied in the medium.

The software aspects of the present invention may be stored, implemented and/or distributed on any suitable computer usable or computer readable medium(s), including but not limited to, any medium that can contain, store, communicate, propagate or transport the program for use by or in connection with an instruction execution system of a corresponding processing device. The computer program product embodiments of the present invention may each have computer usable or computer readable program code portions thereof, which are stored together or distributed, either spatially or temporally across one or more devices. A computer-usable or computer-readable medium may comprise, for example, an electronic, magnetic, optical, electromagnetic, infrared, or semiconductor system, apparatus, device, or propagation medium.

More specific examples of the computer usable or computer readable medium comprise an electrical connection having one or more wires, swappable intermediate storage mediums such as floppy drives, tape drives or external hard drives a portable computer diskette, a hard disk, a random access memory (RAM), a read-only memory (ROM), an erasable programmable read-only memory (EPROM or Flash memory), an optical fiber, a portable compact disc read-only memory (CD-ROM) or digital video disk (DVD), an optical storage device, a transmission media such as those supporting the Internet or an intranet, or a magnetic storage device. The computer-usable or computer-readable medium may also comprise paper or another suitable medium upon which the program is printed, as the program can be electronically captured, for example, via optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave or a carrier signal. The computer usable program code may also be transmitted using any appropriate medium, including but not limited to the Internet, wireline, optical fiber cable, RF, etc.

Computer program code for carrying out operations of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single computer, partly on one or more different computers, as a stand-alone software package, partly on a first computer and partly on a remote computer or entirely on the remote computer or server. In the latter scenario, the remote computer may be connected to the first computer through a network such as a local area network (LAN) or a wide area network (WAN), or the connection may be made to an external computer, for example, through the Internet using an Internet Service Provider.

The present invention is described below with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

Referring now to the drawings and particularly to FIG. 1, a general system diagram of a network system 10 is illustrated. The system 10 comprises a plurality hardware and/or software processing devices 12 that are linked together by a network 14. An exemplary processing device 12 comprises a server, personal computer, notebook computer, transactional system, appliance or pervasive computing device such as a personal data assistant (PDA), palm computer, cellular access processing device, special purpose computing device, printing and imaging device, facsimile device, storage device and/or other device having an instruction execution system.

Each processing device 12 may execute software including an operating system and one or more processes, including applications that may interact with the operating system and various databases, spreadsheets, structured documents, unstructured documents, other files containing information and/or hardware, which are local to a given processing device 12 or are accessed via other processing devices 12 on the network 14.

For example, an operating system typically provides a defined application program interface (API) that allows application programs such as word processors, spreadsheets, web browsers and other common software applications to request hardware resources and other system services. In response to application program requests via the API, the operating system controls the allocation and de-allocation of appropriate hardware resources, such as central processing unit time, system memory access, storage access, network connectivity, keyboard, mouse, monitor or printer control etc.

The network 14 provides communications links between the various processing devices 12, and may be supported by networking components that interconnect the processing devices 12, including for example, routers, hubs, firewalls, network interfaces wired or wireless communications links and corresponding interconnections. Moreover, the network 14 may comprise connections using one or more intranets, extranets, local area networks (LAN), wide area networks (WAN), wireless networks (WIFI), the Internet, including the world wide web, and/or other arrangements for enabling communication between the processing devices 12, in either real time or otherwise, e.g., via time shifting, batch processing, etc.

Although the exemplary system 10 is illustrated as a distributed computing system, it is also possible to practice various aspects of the present invention within a single processing device 12, such as a server computer or personal computer. As such, the network 14 is shown by way of illustration, and not by way of limitation, as an exemplary computing environment in which various aspects of the present invention may be practiced.

For a given processing device 12, a software or hardware error may cause a program, process, service or other system component, including the operating system, to fail. For example, errors such as illegal instructions, memory-address violations and bus and other hardware and/or software errors can cause the operating system or programs executing therein, to abort. In such an event, many operating systems can generate a core dump 16 prior to termination of operation.

The core dump 16 is a file that corresponds to the state of the processing device 12 at the time the core dump is written. The core dump 16 may be useful to debug the root cause of the error, such as by containing information that allows an analyst examining the core dump 16 to determine the address of an instruction that failed to properly execute, by identifying the state of machine registers, etc. For example, as shown, one of the processing devices 12 has generated a core dump 16 that preserves a snap shot of the contents of physical memory of the processing device 12. The core dump 16 may have been generated as the result of a crash, or the core dump 16 may have been intentionally triggered as part of an analysis process.

Exemplary data from the physical memory that is stored in the core dump 16 comprises data for processes 18 including computer executable instructions, identified as process 1-*n* data, pointers 20, identified as pointers 1-*m,* a plurality of addresses and corresponding address content 22, as well as a plurality of registers and corresponding register content 24. Further, there may be database information 26 and/or other miscellaneous data 28, which may include structured or unstructured data that was loaded into the physical memory of the processing device 12 and that was captured in the core dump 16. Additional examples of the content of core dumps 16 will be explained in greater detail below.

It is likely that the operator of a processing device 12 that generates a core dump 16 will not have the technical expertise to analyze the core dump data in such a meaningful way as to determine a root cause of the problem that led to the failure. As used herein, the term "operator" comprises a person interacting with the processing device 12. An operator also comprises, in a broader sense, any person associated with the operation or maintenance of the processing device 12, or any person or entity that owns, maintains, possesses or otherwise controls the processing device 12. For example, an operator may comprise a user, supervisor or other person who has permission to operate the processing device 12, an information technology support person such as a network administrator, data analyst or other information technology support person who maintains, manages or supports operation of the processing device 12. In yet a broader sense, the operator may also be an entity such as a corporation, a for-profit or not for-profit business concern, partnership, association, club, professional organization, government entity, agency or other entity a business, government organization, association etc., that owns, maintains, possesses or otherwise controls the processing device 12.

Accordingly, the operator typically contacts a third party such as the vendor of the software or hardware that either triggered or otherwise generated the core dump 16, e.g., an operating system vendor. The operating system vendor typically provides a product support team, systems expert or other technical support person who can diagnose problems based upon an analysis of the core dump 16 if such data exists. Accordingly, it may become necessary to communicate a core dump 16 to a third party who is unrelated to the operator of the processing device 12 that generated the core dump 16.

As noted above, a core dump 16 typically captures the content of the physical memory of a processing device 12 at a snapshot in time. The physical memory of the processing device 12 may contain sensitive information that the operator does not want to risk divulging. The term "sensitive information" includes information that is not intended to be publicly divulged or otherwise made generally known. As such, that which is considered "sensitive information" will vary depending upon the application, the tolerance of operator, including the network administrator or other information technology person, the nature of the processes running in memory at the time of the core dump 16, and other similar types of factors.

For example, sensitive information may be any information that can be used to compromise the security and/or confidentiality of either the entity that controls the processing device 12 that generated the core dump 16, or of clients or other persons who have entrusted the entity with confidential information. Exemplary sensitive information comprises confidential, proprietary or otherwise secret information, which may include, but is not limited to a Social Security number, driver's license number, tax identification number, password, account information including account numbers, operator identification codes, contact information including names, addresses and telephone, pager email or other personal or business related information, account balances, transaction amounts, serial numbers, access codes and other types of data that may be resident in the memory of a computer system when a core dump 16 is evoked. Sensitive information can further comprise information that is associated with a particular process or program that may be resident in a core dump.

Figure 2:
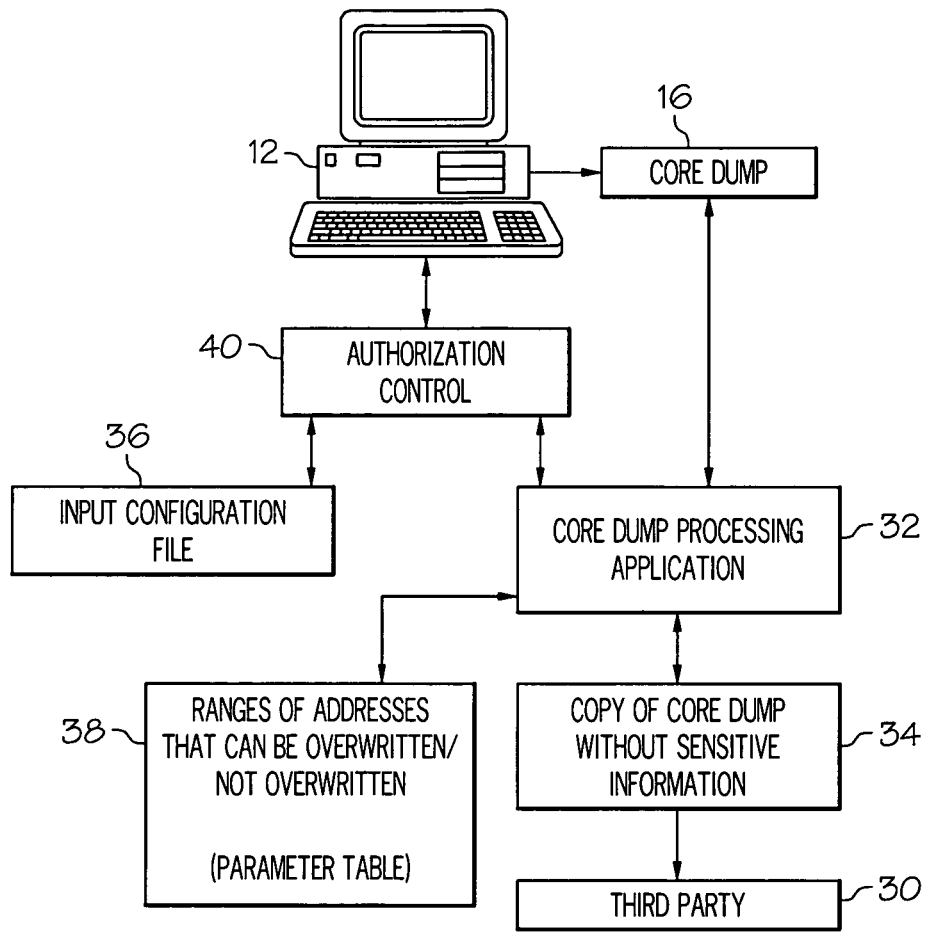
FIG. 2 illustrates an exemplary system flow for a core dump processing application according to an aspect of the present invention.

Referring to FIG. 2, in order to prevent sensitive information from being distributed along with a core dump 16 to a third party 30, a core dump processing application 32 is executed on either the processing device 12 that generated the core dump 16, or on a different processing device 12 that is in data communication with the core dump 16, e.g., via the network 14 or via some fixed or removable storage device, such as a portable hard disk, CD, DVD, tape, etc. The core dump processing application 32 may be used to identify whether sensitive information exists in a core dump 16, and/or to create a core dump copy 34 from at least a portion of the original core dump 16 with sensitive information that has been altered, e.g., masked, concealed, erased, filtered, changed, modified, adjusted, disguised, removed or otherwise rendered non-apparent. This new core dump copy 34 can be transmitted over a secure link to a product service team of the third party 30, e.g., an operating system vendor, for use in debugging the root cause that triggered the generation of the original core dump 16.

Sensitive information may be identified in a core dump 16 by way of input parameters, e.g., from an input configuration file 36 describing strings, filenames, process names and other patterns. For example, input parameters may be utilized to identify and/or alter sensitive information with arbitrary or default strings. Input parameters may also be utilized to specify areas of the core dump 16 that either can or should not be overwritten. For example, the core dump processing application can generate one or more lists 38, e.g., of address information such as ranges, where sensitive information may be altered and address ranges where sensitive information should not be altered.

Input parameters can be presented through any computer input device or programming application program interface (API), such as an input disk file, Web browser, graphic input device, command line, etc. Thus, input parameters of any form can be saved, reused or modified. Additionally, input parameters of any form may be subject to authorization control 40. For example, input parameters may be encrypted or otherwise protected by the operator, e.g., using user-ids, passwords and/or authorization rules to restrict access to the input parameters. Likewise, the authorization control module 40 may apply authorization features to the core dump processing application itself, e.g., to restrict or otherwise limit users of the core dump processing application 32 and/or to authenticate or verify authorized user identity.

Sensitive information may also be identified in a core dump 16 by way of operating system control information. For example, knowledge of process control blocks or other system control/architecture data may be utilized to identify data for the processes that contain sensitive information and thus may be altered. Operating system control information may also be utilized to identify areas of the core dump that should not be altered. The identification of sensitive information is discussed in greater detail below.

Figure 3:
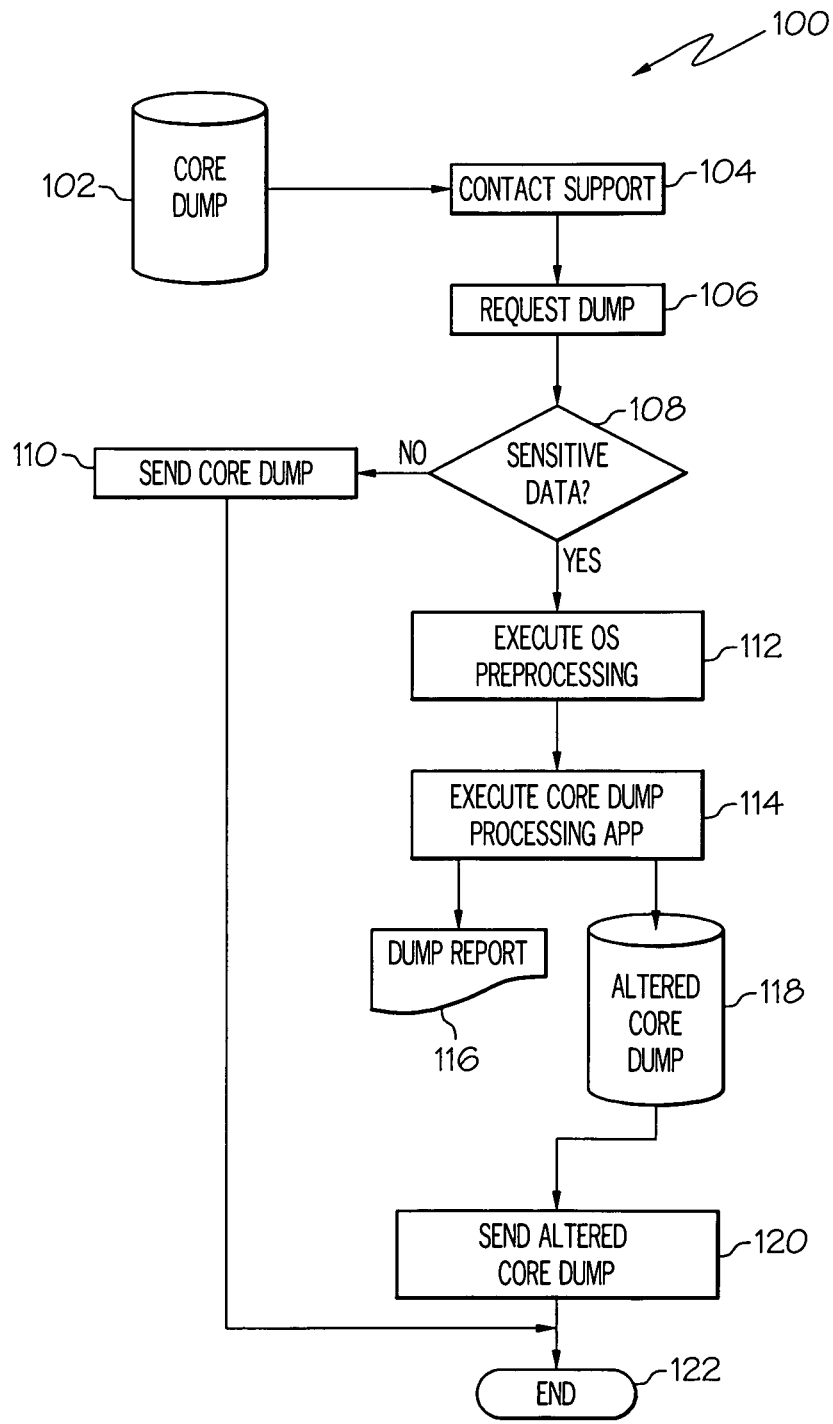
FIG. 3 is a flow chart illustrating the main flow of a process for sending a copy of a core dump to a third party where sensitive information in the copy of the core dump is identified and/or altered.

With reference to FIG. 3, a method 100 of sending a core dump to a third party is illustrated. A core dump occurs at 102. As noted in greater detail herein, the core dump may have been triggered as a result of hardware or software failure, e.g., an attempt to execute an illegal instruction or memory access. The core dump may have also been a deliberate act, such as via the execution of a system diagnostic, debugging or testing process or other triggering event. Recognition of the failure and/or generation of the core dump at 102 triggers an operator, such as a network administrator, to contact a technical support group of an appropriate third party software or hardware vendor at 104. In a typical application, the appropriate vendor will likely be a major component provider, such as the operating system vendor.

A data analyst in the technical support group for the third party vendor determines that it is necessary to analyze the core dump because it is required for debugging the root cause of the error. Thus, the data analyst for the vendor requests a core dump copy at 106. The operator is thus left to determine whether the original core dump contains sensitive information in deciding whether it is appropriate to send a non-altered copy of the core dump to the data analysts of the third party vendor in view of the potential for a security exposure that might result.

A decision is made at 108 as to whether the original core dump contains sensitive information. For example, the operator may use the core dump processing application 32 described with reference to FIG. 2, and which will be described in greater detail herein, to search a core dump (either the original core dump or a core dump copy) for the presence of sensitive information. If there is no sensitive information detected, or if the operator is not concerned with the potential for a security exposure of any sensitive information, then a non-altered copy of the core dump is communicated to the data analysis experts of the corresponding third party vendor at 110 and the process ends at 122. Otherwise, the operator may determine that sensitive information in the core dump copy should be altered, e.g., masked, concealed, erased, filtered, changed, modified, adjusted, disguised or otherwise rendered non-apparent.

Various operating systems handle core dumps in different manners. Moreover, certain operating system manufacturers externally document at least some information concerning the logical arrangement and structure of the core dump, while other manufacturers have not externally documented the structure of their core dumps. As such, depending upon the operating system that generated the core dump, some operating system specific preprocessing may be required at 112. For example, for certain proprietary operating systems, it may be necessary to execute debugging methods or routines, such as those found in a debug engine, other dynamic link library or application, published API or other process provided by the operating system manufacturer in order to find specific pieces of information in a core dump. Preprocessing at 112 may be performed on a processing device 12 other than the device 12 that failed, e.g., using the same level of operating system as the failing system on which the dump was produced.

Preprocessing may be necessary, for example, to locate relevant information in the core dump. Preprocessing can produce a file with relevant offsets in the core dump, for example the location of process control blocks such as the process environment blocks (PEB), etc.

For example, certain operating systems, such as Microsoft Windows operating system by Microsoft Corporation of Redmond Wash., do not currently have an externally documented (well documented) format for the core dump that is generated by the Windows operating system. Under these types of circumstances, it may be necessary to perform preprocessing by executing debugging methods or routines, such as those found in the Windows Debug Engine, on the same level of operating system as the failing system on which the dump was produced. The preprocessing performed at 112 may not be required, for example, where an operating system that generates the core dump is externally well documented, or where offsets and the locations of key control blocks are known.

Upon completion of any necessary preprocessing at 112, or in concomitant execution of any necessary preprocessing at 112, the operator executes a core dump processing application at 114, e.g., the core dump processing application 32 described with reference to FIG. 2. The core dump software may be utilized to scan the core dump (original or copy) to identify occurrences of sensitive information and to optionally alter occurrences of identified sensitive information. If the operator chooses only to scan the core dump for sensitive information, a dump report may be produced at 116. If the operator chooses to alter sensitive information, a new copy of at least a portion of the original core dump is produced with the sensitive data altered at 118. Further, a report or other suitable output may optionally be prepared at 116. The core dump, e.g., the altered core dump copy generated at 118, is communicated to the third party vendor at 120 and the process ends at 122.

The altered copy of the core dump preserves all important control information for the operating system, services, processes and other software, including user applications. Thus, the technical support group for the third party vendor can perform root cause analysis with the core dump copy, regardless of the fact that sensitive information has been altered, e.g., masked, concealed, erased, filtered, changed, modified, adjusted, removed, disguised or otherwise rendered non-apparent.

Figure 4:
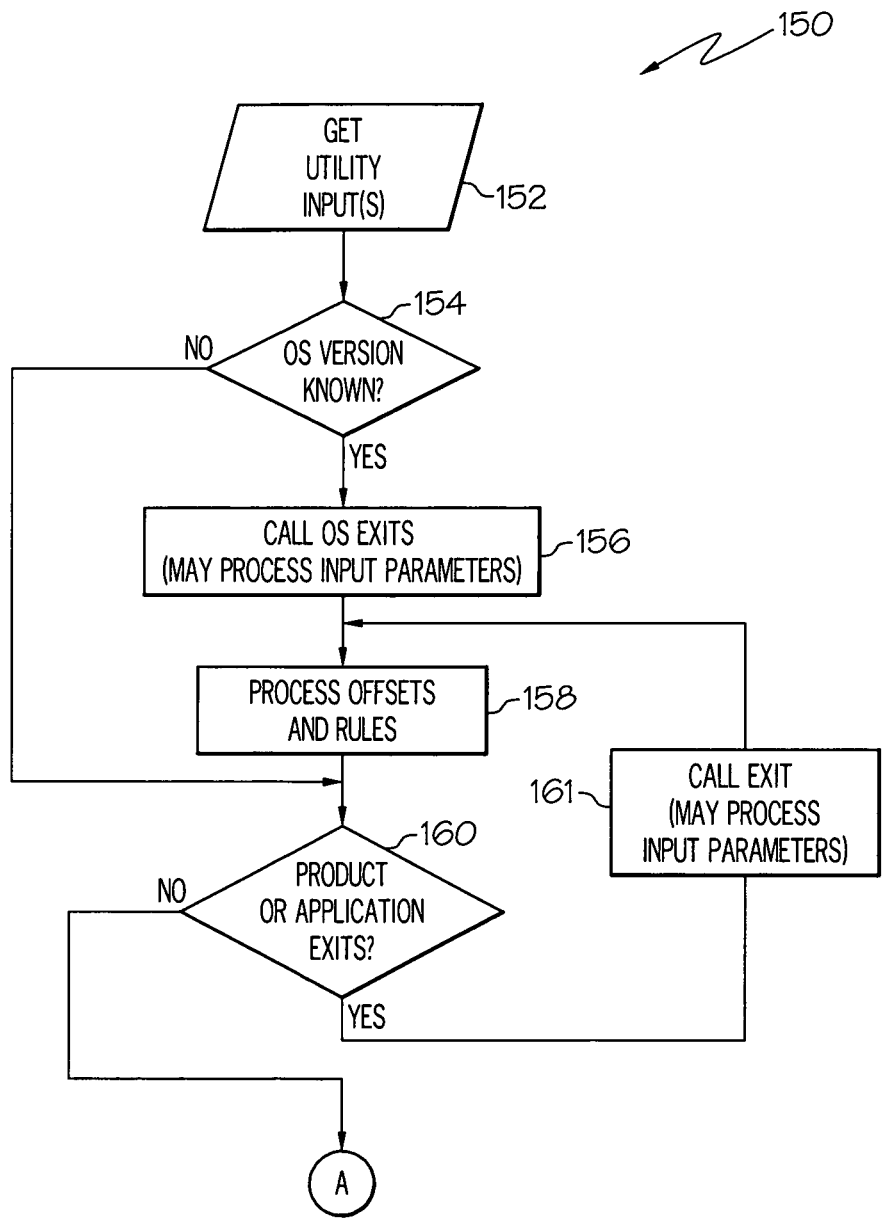
FIGS. 4-5 is a flow chart illustrating an exemplary process for scanning a core dump for sensitive information, which may be implemented as part of the process of FIG. 3.
Figure 5:
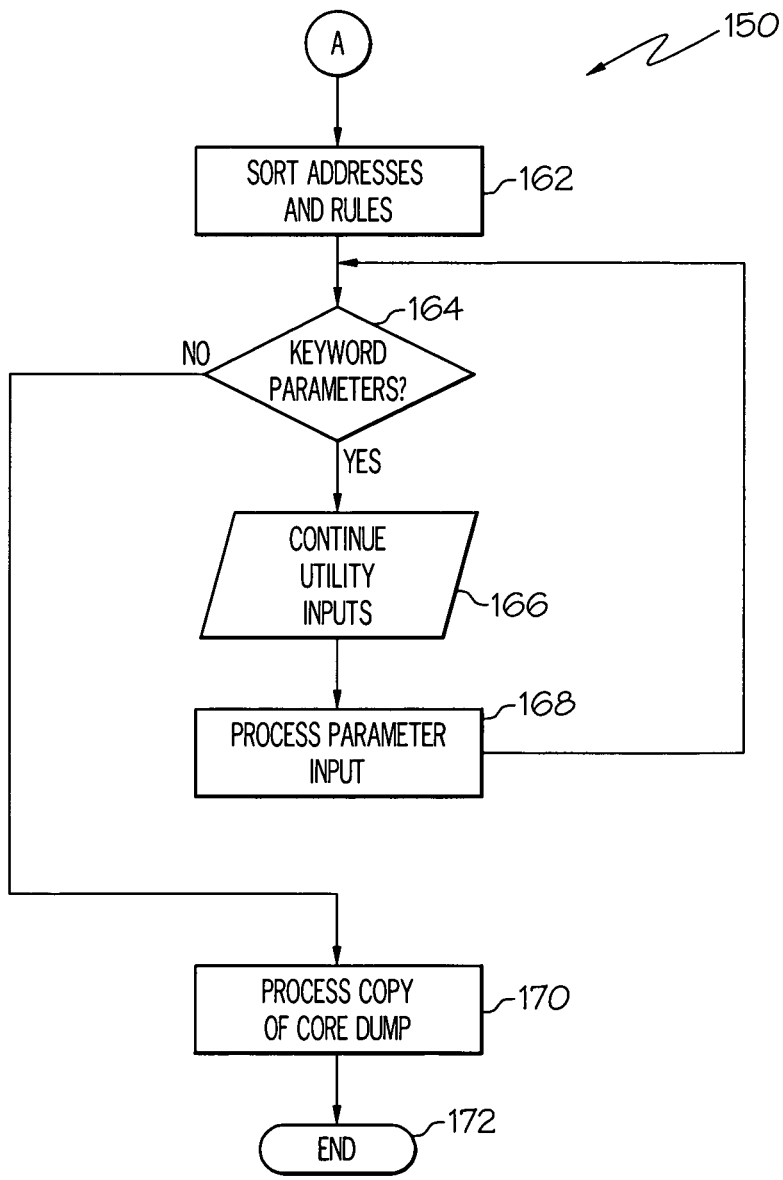

Referring to FIGS. 4-5, a method 150 illustrates execution logic that may be utilized for preprocessing operations and/or for preparation of processing a core dump, e.g., using an exemplary implementation of the core dump processing application described with reference to FIG. 2. The method 150 corresponds to the execution of OS preprocessing at 112 in FIG. 3 and further illustrates an exemplary implementation of part of the core dump processing application at 114, described with reference to FIG. 3.

The processing described with reference to the method 150 shown in FIGS. 4 and 5 may be performed, for example, to identify ranges of offsets where data is to be replaced and to specify replacement characters or offsets that must be protected. The actual process of altering a copy of the dump and/or scanning the dump for sensitive information is shown and described with reference to FIGS. 6 and 7.

An input is provided at 152. The input may be provided in any suitable form, such as an input configuration file provided on disk, tape or data transmission line. Under this arrangement, the input configuration file may correspond to the input configuration file 36 described with reference to FIG. 2. Alternatively, input information may be provided, for example, via a Graphical User Input (GUI) application; a Web Browser; a command line; or an application programming interface (API), whereupon, once entered, the input information defines an input configuration file. The input information identified in the input configuration file may be used to identify and/or alter, e.g., mask, conceal, erase, filter, change, modify, adjust remove, disguise or otherwise render non-apparent, select information such as sensitive information, within a core dump or core dump copy. For example, the information provided in the input configuration file may comprise keywords and optional corresponding value(s), e.g., a pattern or patterns, replacement strings, commands, instructions, rules, expressions, exceptions, identifying information, etc. Some exemplary keywords are described in greater detail below.

A decision is made at 154 as to whether the operating system and optionally, the operating system version/level, are known or can be determined. The operating system and optional version/level may be specified in the input configuration file or may be determinable by the core dump processing application (examples of which are described below). The core dump processing application may perform operating system preprocessing, e.g., by calling at least one operating system exit for the identified operating system (and level/version) at 156 if the operating system is known or is discovered by the core dump processing application. Exits, including operating system exits, are described in greater detail below. The core dump processing application also loops through the input configuration file to process any list of product, application or other exits. If an exit is specified in the input configuration file, the core dump processing application calls that exit. Each exit reads from the core dump in order to perform the required processing, such as building a list of dump offsets, e.g., address ranges, and processing rules that apply to those address ranges, such as whether to replace or protect the data.

Each OS exit reads the dump to process the rules and offset(s) at 158, e.g., to create a list of addresses and rules. Further, a check is made at 160 as to whether there are additional unprocessed exits, e.g., application or product exits, such as may be identified in the input configuration file. If there are exits remaining in the input configuration file, then the core dump processing application calls the exit at 161 and loops back to 158 to process any associated offsets and rules. If no more product or other application exits are left to be processed in the input configuration file, then the process continues.

Exit programs are normally provided as part the operating system, software products, applications and/or program packages. An exit program, also sometimes referred to as an exit routine, is a section of programming code that is entered when a particular condition occurs. Exits related to the operating system version may be automatically called at 156 without directly specifying the call in the input configuration file if the operating system is known or determined. However, other exits may require explicit listing in the input configuration file to be processed.

Operating system exit call(s) at 156 utilize addresses and rules, expressions and/or exceptions to create a list or table of address information associated with the core dump or core dump copy that corresponds to at least one of the addresses where information can be altered or addresses where information should not be altered. A status code may also be provided for the address ranges to distinguish addresses that are either designated to be overwritten or should be protected from overwriting. These address ranges and an optional status code or other additional information is returned, for example, to the core dump processing application and may be stored in memory, on a disk or other suitable storage medium. As will be seen in greater detail below, the core dump processing application may further keep the virtual ranges of addresses in a structure in memory, which is sorted, for example, in ascending order, after all exits have been called at 156 and 161 to facilitate further processing. The table of virtual address ranges may correspond, for example, to the list(s) 38 described with reference to FIG. 2. The call to product and application exits normally would be for the purpose of protecting address ranges containing specific control data for those products and applications, more so than to handle data matching of user supplied patterns.

Rules and algorithms may also be defined, e.g., in the input configuration file for finding address ranges of data areas that should be either protected from overwriting or are designated as acceptable to be overwritten. A rule might comprise, for example, using an address in a register, adding an offset to this address, using data in that location as a pointer, etc. An Address can be an absolute address that corresponds to a specific virtual address in the copy of the core dump, e.g., X'58C', the address may be relative addresses or the addresses may be indirect and thus serve as a pointer to another location in the core dump.

Non-operating system exits, such as for product or application exits that are called at 161 may be useful, for example, to identify their associated data structures in the core dump and to insure that the ranges of addresses containing such data structures in the core dump are protected against replacement. Non-operating system exits may also perform other defined processing functions based upon particular requirements. This may be necessary, for example, to preserve the integrity of internal data and control blocks required to debug those products and applications. Without this step, the integrity of the dump may be compromised. Information derived from such exit calls may be utilized by the core dump processing application at 158 to identify, specify, generate update or further modify the table of virtual addresses that is generated as a result of any operating system exit calls. Thus, accidental corruption of the copy of the core dump caused by inadvertently overwriting data that happens to look like sensitive information may be avoided.

The operating system vendor may supply or otherwise make information about the format of the core dump available. Thus, it may be possible to describe a series of steps to locate relevant control information in the core dump to create the table of virtual addresses. An example of a core dump format is described in greater detail below with reference to the z/OS operating system by International Business Machines (IBM) of Armonk, N.Y. If the format of the core dump is not known, the core dump processing application may fill in as much information as can be discerned from the exit calls at 156 and 161.

Referring to FIGS. 4-5, address information such as ranges of addresses returned by exit processing at 156 and 161 are sorted, e.g., in ascending order, and are maintained in a structure such as a table, in memory at 162 if not already performed as part of exit processing at 156 and 161. For purposes of discussion herein, this table is also referred to as a parameter table.

A check may be performed, for example, to ensure that ranges for protection and replacement do not overlap. Overlapping protection and replacement ranges may be considered an input error and an appropriate action may be performed. For example, if a replacement range overlaps with a protection range, then overlapping addresses may be designated as protected. If replacement ranges overlap each other, a corrective action may be performed, e.g., by consolidating the overlapping ranges into a single range. In an analogous manner, if protection addresses overlap each other, the overlapping protection addresses may be consolidated into a single range.

The inputs from the input configuration file that are not exits are processed at 164, 166 and 168. Such additional inputs may comprise operator-identified strings, patterns, programs, processes and other information that is considered sensitive and should be altered if located in a non protected memory location in the copy of the core dump. Examples of such inputs are described below. In particular, a decision is made at 164 as to whether there are any inputs remaining to be processed. If so, the next input parameter is obtained at 166, e.g., by reading the input parameter from the input configuration file. If the inputs are operator keyword parameters, then the operator parameters are processed at 168 and flow returns to 164 to check for additional core dump processing application inputs.

The processing performed at 168 will likely vary depending upon the type of keyword parameter that is specified. However, in general, the keyword parameter is converted to an internal form that is stored in the parameter table. Once the parameters have been converted to a corresponding internal format, any additional parameter table processing is performed at 170, and the process of building the parameter table ends at 172. The parameter table thus ultimately contains the offsets to be replaced and the corresponding replacement values.

If the configuration file contains filenames, these files may be processed according to their type, e.g., list of keywords or list of offsets. Also, if a table of target strings is created for non-process related data, it may be checked for duplicates as well. All duplicate strings may then be eliminated from the table.

If an operating system, program or other exit can be called at 156 and/or 161, then sorting and processing of input parameters at 164, 166 and 168 may alternatively be processed within the exit calls themselves, as designated by the parenthetic in 156 and 161 as will be described in greater detail below. As such, the processing of input parameters at 164, 166 and 168 may be a subset of exit processing at 156, 161 or the processing of input parameters at 164, 166 and 168 may be performed as separate processes either before or after exit processing at 156, 161. The particular arrangement of the core dump and the information available concerning the format of the particular core dump will affect the determination of the most efficient or appropriate order of processing of the input parameters and exit calls.

As noted above, an input configuration file may be used to define parameters such as keywords and corresponding values, which are used when processing the copy of the core dump. The exemplary keywords and values below are provided by way of illustration and not by way of limitation of the types, format, style and arrangement of data in an exemplary configuration file.

The input parameter "OS" may be used to define the name of the operating system that has generated the core dump, e.g., "OS=LINUX" or "OS=z/OS", etc. In one exemplary usage, only one occurrence of this keyword is required for a given input configuration file. This information may be useful to the core dump processing application, e.g., where the core dump processing application has special knowledge of the structure of the core dumps written by the particular operating system.

The input parameter "OSLEVEL" may be used to define the operating system version and level of the system generating the core dump. As with the OS keyword, only one occurrence of this keyword is typically required for a given input configuration file. The operating system version or level may be useful to the core dump processing application, e.g., where the core dump processing application has special knowledge of the differences in structure of the core dumps written by different versions within the same general operating system.

The input parameter "THISOS" may be used to indicate that the core dump processing application should attempt to discover the operating system and optionally, the version or level from the processing device on which it is being executed, in a manner corresponding to the OS and OSLEVEL parameters described above. The obtained information and any known information regarding the identified operating system and version/level, if available, may then be utilized for performing sensitive information location and/or altering operations as described more fully herein.

The input parameter "FILENAME" may be used to define filenames or filenames and pathnames of files that contain sensitive information. Multiple instances of this keyword may be utilized in the input configuration file. When interpreting this keyword, the core dump processing application builds file information into the parameter table during processing at 168 (and optionally at 170) that will enable the core dump processing application to identify instances or fragments of a specified file within the core dump or a copy thereof during subsequent core dump processing, e.g., as will be described herein with reference to FIGS. 6-7. For example, partial file contents may be found in I/O buffers used by the operating system when a file is opened for reading or writing. The particular value corresponding to the FILENAME parameter may be specified by a corresponding value in the input configuration file or by a predetermined default value. For example, an input configuration file may contain "FILENAME=ZZZ001". Each instance of the file ZZZ001 that is located in a non-protected (acceptable to overwrite) area of the core dump copy is altered, such as by concealing or otherwise replacing the file contents with characters, symbols, predetermined patterns, sequences of characters or other indicia that mask the actual file information.

In order to maintain the integrity of the core dump, it may be required to ensure that the size of the altered file is the same size as the previous information. For example, the core dump processing application may perform a one to one replacement of characters. The identified file, e.g., ZZZ001, may also link, call, reference or otherwise point to other files that contain sensitive data that must be altered as well, so the core dump processing application may follow links, pointers, etc., to replace all of the corresponding data identified by or pointed to by the value of the FILENAME parameter.

The input parameter "PROCESS NAME" may be used to define the name of a process that contains sensitive information. Multiple instances of this keyword may be utilized in the input configuration file. When interpreting this keyword, the core dump processing application builds process information into the parameter table during processing at 168 (and optionally at 170) that will enable the core dump processing application to identify instances or fragments of a specified process within the core dump or a copy thereof during subsequent core dump processing, e.g., as will be described herein with reference to FIGS. 6-7. The particular value corresponding to the PROCESS NAME parameter may be specified by a corresponding value in the input configuration file or by a predetermined default value. For example, an input configuration file may contain "PROCESS NAME=PROC001". Each instance of the processes PROC001 that is located in a non-protected (acceptable to overwrite) area of the core dump copy is altered, such as by concealing or otherwise replacing the file contents with characters, symbols, predetermined patterns, sequences of characters or other indicia that mask the actual file information, e.g., in a manner that is conceptually similar to that described above for implementing FILENAME processing.

The input parameter "PROCESS ID" may be used to define a numeric identifier of a process (PID) that contains sensitive information. Multiple instances of this keyword may be utilized in the input configuration file. When interpreting this keyword, the core dump processing application builds process information into the parameter table during processing at 168 (and optionally at 170) that will enable the core dump processing application to identify instances or fragments of a specified process within the core dump or a copy thereof during subsequent core dump processing, e.g., as will be described herein with reference to FIGS. 6-7. The particular value corresponding to the PROCESS NAME parameter may be specified by a corresponding value in the input configuration file or by a predetermined default value, e.g., in a manner that is conceptually similar to that described above for implementing PROCESS NAME processing.

The input parameter "USERID" may be used to define a list of Userids that should be replaced with a string of characters the same length as the userid in the copy of the core dump. For example, depending upon the length of the userid, the replacement string may start with "U", "US", "USR", "USER", etc., followed by a monotonically increasing numeric or other suitable character reference that is specific to all occurrences of that particular userid. Multiple instances of this keyword may be utilized in the input configuration file.

For example, an input parameter USERID="Kim" may instruct the core dump processing application to build user information into the parameter table at 168 (and optionally at 170) and to replace each instance of the userid "Kim" that is located in a non-protected area of the core dump copy with the string "U01" during subsequent processing (described herein with reference to FIGS. 6-7) such that the string "Kim", which comprises three characters, is replaced by a string of equal length and of a designated pattern. Similarly, an input parameter USERID="Marilyn" may instruct the core dump processing application to build user information into the parameter table at 168 (and optionally at 170) and to replace each instance of the userid "Marilyn" that is located in a non-protected area of the core dump copy with the string "USER001" during subsequent processing. Alternative patterns, characters, strings and other replacement indicia may also be used to alter sensitive userid information.

The input parameter "STRING" may be used to define an exact string that should be replaced in the copy of the core dump. Multiple instances of this keyword may be utilized in the input configuration file. The replacement character(s) can be specified by a corresponding value, which may comprise a single character or pattern that is repeated depending upon the size of the corresponding string. Thus, for example, an input parameter "STRING=ABC$123;Z" may instruct the core dump processing application to build string information into the parameter table at 168 (and optionally at 170) and to replace each instance of the string "ABC$123" that is located in a non-protected area of the core dump copy with the string "ZZZZZZZ" during subsequent processing as will be described in greater detail herein. Alternatively, the replacement string can default to a predetermined designation, e.g., to the letter A for alphabetic characters, the number 9 for numeric characters and blank for all other characters. Thus, keeping with the present example, the core dump processing application would replace each instance of the string "ABC$123" that is located in a non-protected area of the core dump copy with the string "AAA 999" during subsequent processing.

As noted above, the replacement string value may comprise a pattern. Thus, for example, an input parameter "STRING=PRIVATE ACCOUNT NO 555-111; AAAAAAA@AAAAAAA@AA%999^999" may instruct the core dump processing application to replace each instance of the string "PRIVATE ACCOUNT NO 555-111" that is located in a non-protected area of the core dump copy with the specified string AAAAAAA@AAAAAAA@AA%999^999 during subsequent processing.

The input parameter "HEXSTRING" may be used to define an exact hexadecimal string to be replaced in the copy of the core dump. The replacement character(s) can be specified by a corresponding value, which may comprise a single character or pattern that is repeated depending upon the size of the corresponding string. Alternatively, the replacement string can default to a predetermined designation in a manner analogously to that described with reference to the STRING parameter. Multiple instances of this keyword may be utilized in the input configuration file.

Thus, for example, an input parameter "HEXSTRING=A1 01 04 D9; 00 FF 00 FF" may instruct the core dump processing application to build hex string information into the parameter table at 168 and to replace each instance of the hexadecimal string "A1 01 04 D9" that is located in a non-protected area of the core dump copy with the string "00 FF 00 FF" during subsequent processing. Alternatively, the hexadecimal string may default to a predetermined value such as 00 or FF.

The input parameter "PATTERN" may be used to define a string pattern to be replaced in the copy of the core dump with a selected repeating character, pattern of characters or formatted string of equal size to the data being replaced. Multiple instances of this keyword may be utilized in the input configuration file. The replacement character(s) can be specified by a corresponding value, which may comprise a single character or pattern. Alternatively, the replacement string can default to a predetermined designation in a manner analogously to that described with reference to the STRING parameter.

For example, an identified input parameter for a telephone number such as "PATTERN=(999)-999-9999" may instruct the core dump processing application to build pattern information into the parameter table at 168 (and optionally at 170) and to replace each instance of any pattern that includes the character "(" followed by any three numeric values, followed by the characters ")-" followed by any three numeric values, followed by the character "-" followed by any four numeric characters that is located in a non-protected area of the core dump copy with the string (999)-999-9999 during subsequent processing. The PATTERN input parameter may also be used to replace all alphabetic characters, e.g., any combination of A-Z, blank spaces, e.g., ASCII character 32, symbols etc. Further, in the input configuration file, asterisks or any other predetermined symbol may be utilized as a wildcard to denote that the pattern can be of any length.

Thus, an input parameter, "PATTERN=$9*;Z9 may instruct the core dump processing application to replace each instance of any dollar amount that is located in a non-protected area of the core dump copy by replacing the symbol "$" with the character "Z" and replacing all numeric values with the "9" for each digit location during subsequent processing. The pattern "$10" located in the core dump copy is thus replaced with "Z99". Similarly, the pattern "$10500" is replaced by the pattern "Z99999" in the copy of the core dump. As yet an additional example, the input parameter "PATTERN=9* A* A*" may instruct the core dump processing application to replace each instance of any address that is located in a non-protected area of the core dump copy. Thus, the address "123 East Avenue" located in the core dump is replaced with "999 AAAA AAAAAA". Patterns may be used, for example, to replace social security numbers, telephone numbers, addresses, dollar amounts, etc.

The core dump processing application may be configured to automatically interpret certain permutations of a given keyword pattern, or the operator may manually enter such permutations into the input configuration file. For example, for typical addresses, a five digit zip code may suffice, e.g., 55555. However, certain addresses, such as those in more densely populated areas may require a nine digit, hyphenated zip code, such as 55555-5555. In these cases, the core dump processing application may recognize that there are several alternative expressions for the keyword pattern and automatically search each alternative or the core dump processing application may require that each of the alternative forms of the keyword pattern be provided in the input configuration file.

Built in patterns may also be provided. Built in patterns can be specified, for example, as PHONENUM, CREDITCD, SSNUM, etc. For example PHONENUM may include the patterns (999)999-9999 and 999-999-9999. Additional patterns may also be provided, for example, to include a country code, to include telephone extensions, etc. As yet another example, SSNUM may include 999-99-9999 and 999999999, etc.

The input parameter "EXITNAME" may be used to define a name of a required program to be called for processing the current core dump. Multiple instances of this keyword may be utilized in the input configuration file. Exits provide information to the core dump processing application about specific offsets, control blocks, rules (algorithms), etc., for identifying data in address ranges that are to be either replaced or protected. An algorithm might be required for locating certain structures in the core dump, such as file buffers or data related to a process. Also, it is possible to have address ranges in the copy of the core dump that must be preserved such that information in those address ranges must not be overwritten. The Exit program may require input from an operating system specific preprocessing step. Operating system preprocessing steps are described, for example, with regard to the preprocessing step 112 of FIG. 3, and the operating system exit call 156 of FIG. 4.

The input parameter "SEGSIZE" may be used to define a size, e.g., in megabytes, of a dump segment. A dump segment is a subset of the copy of the core dump that is read into memory for processing. Such is useful where the size of the core dump makes it impossible or prohibitive to load the entire core dump into memory for processing at the same time. In one illustrative example, the default SEGSIZE is 10 Megabytes. This parameter may be specified as nnn where nnn corresponds to the number of megabytes. The SEGSIZE keyword may be specified once for each core dump.

Other syntax, including keyword names, definitions, rules, exceptions, conditions, expressions, etc., may be utilized to define an input configuration file. Moreover, other techniques may be utilized to specify rules, expressions, conditions and other desired outcomes when processing a core dump. Also, when specifying attributes of keywords, e.g., in an input configuration file, an operator may have the option of using a default substitution, or providing a predetermined substitution. For example, a pattern that corresponds to numeric values may have a default replacement character of "9". Thus, a telephone number (555)555-1212 may be replaced with (999)999-9999. However, the operator may override the default replacement character "9" with a user-selected value, e.g., "0" such that the telephone number is replaced with (000)000-0000.

Further, the input configuration file may provide a mechanism whereby the operator can select a "mode" of operation of the core dump processing application. As an example, the operator may designate in the input configuration file that the core dump processing application is to perform a SEARCH function, so as to locate sensitive information without necessarily replacing such information. Under this arrangement, reports, data files and other necessary information can be recorded so that the operator can identify subsequent to processing, whether sensitive information was detected based upon the operator-specified configuration file parameters.

As noted above, once the inputs of the input configuration file have all been processed and the parameter table has been built, the core dump may be processed based upon the corresponding parameter table. The core dump file may comprise a relative large file. Moreover, it may be assumed that available memory on the computer executing the core dump processing application is insufficient to contain the entire core dump. Accordingly, the core dump processing application may include memory management features to ensure satisfactory processing.

Figure 6:
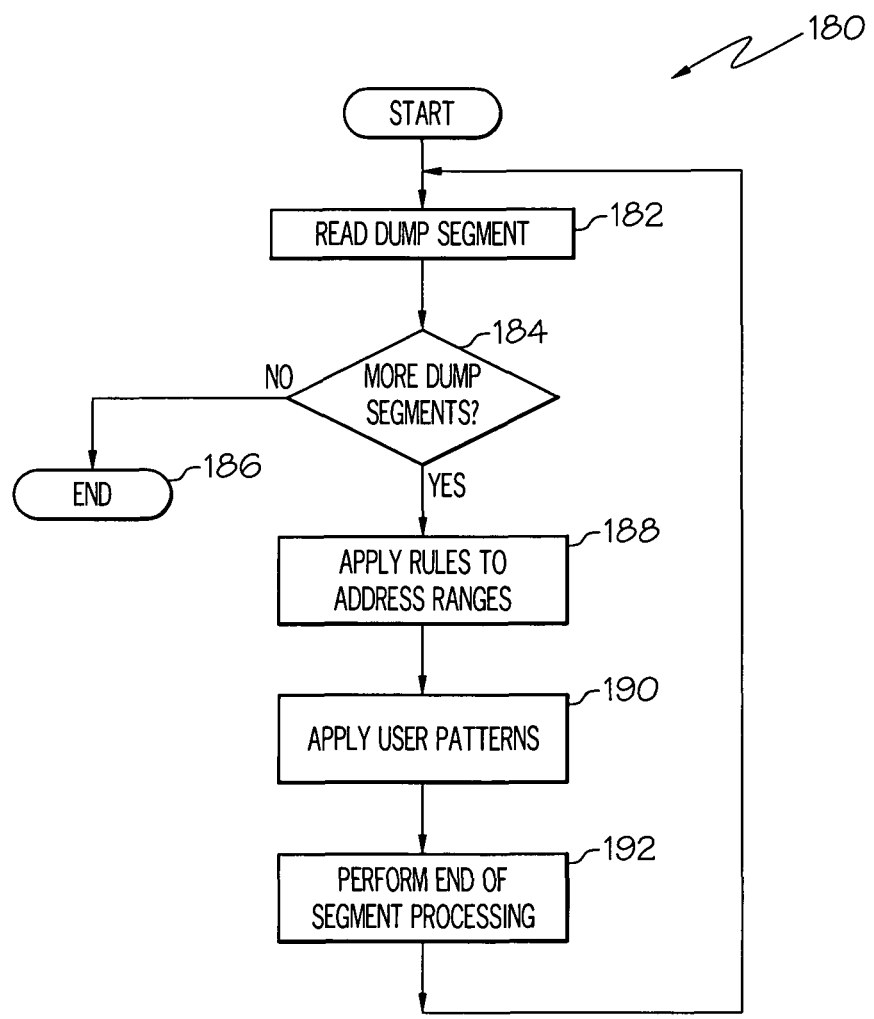
FIG. 6 is a flow chart illustrating an exemplary method of processing a core dump in sections, which may be implemented as part of the process of FIG. 3.

Depending upon the particular arrangement of the core dump, it may be convenient to split the copy of the core dump up into segments and process the input parameters in discrete sections. For example, when processing the data in the parameter table as part of the core dump processing application at 114 described with reference to FIG. 3, it may be necessary or desirable to process the copy of the core dump in a series of sections until the entire core dump copy has been suitably processed. With reference to FIG. 6, an exemplary approach to processing the core dump in multiple passes is illustrated.

A dump segment, e.g., 10 MB or other value such as set by the SEGSIZE keyword or other attribute or keyword in the input configuration file, may be utilized to set the segment to any arbitrary value. Moreover, the segment size may be configurable in other suitable ways. A dump segment is read into a memory buffer at 182. If all dump segments have been processed as determined at 184, then the process is terminated at 186. Otherwise, the rules derived from the parameter table are applied to the address ranges at 188. For example, where a parameter table or other similar data file has been created, addresses and/or address ranges of the current segment of the core dump may be checked against records stored in the parameter table to identify virtual addresses of the core dump (or core dump copy) that require replacement. Identified addresses are replaced to remove sensitive information if such identified addresses are at virtual addresses that can be overwritten. Also, optional report records or other information may be created if the current operation is a scan for sensitive information, or where a report was requested.

User supplied patterns, e.g., those user identified patterns added to the parameter table at 168 with respect to FIG. 5, are applied at 190. For each keyword, the core dump is searched for an applicable pattern match, e.g., according to the list of applicable parameters derived from the input configuration file. Moreover, the core dump processing application may check pattern addresses against protection address ranges. If the core dump processing application detects that there is no conflict, the data is replaced and/or a report record is built if this is a scan or if a report was requested. The data is replaced and/or a report record is built, e.g., if a scan is being performed, or where a report was previously requested.

For each operator-identified input, the core dump is searched for an applicable pattern match. If a match is located, the virtual address of the match in the core dump (or core dump copy) is checked against protection address ranges in the parameter table, e.g., by examining the status code associated with the address or address range. If there are no restrictions to overwriting the matched pattern, then the matched data is replaced in a manner corresponding to an associated prescribed rule and/or a report record is created, e.g., if the operation is a scan and not a replace operation, or where the operator requested a report of such modifications.

When the end of the segment has been reached, it may be preferable or desirable to perform some sort of end of segment processing at 192. End of segment processing allows the core dump processing application to identify patterns that require replacement, where the pattern is split across segment boundaries. A check may be performed by reading the last n bytes of the current segment into a first buffer, where n is the length of the longest pattern to be matched −1. The first n bytes of the new dump segment to be processed are read into a second buffer in memory and the contents of the first and second buffers are concatenated into a third memory buffer. The contents of the third buffer are then checked for pattern matches in a manner analogous to that performed at 188, 190 to ensure that patterns are identified that cross segment boundaries. If a pattern is matched in the concatenated (third) buffer, the applicable data is replaced according to the prescribed rules in the current dump segment and/or new dump segment. Further, a report record may be built, e.g., if the operation is a scan or if the operator requested a report.

Figure 7:
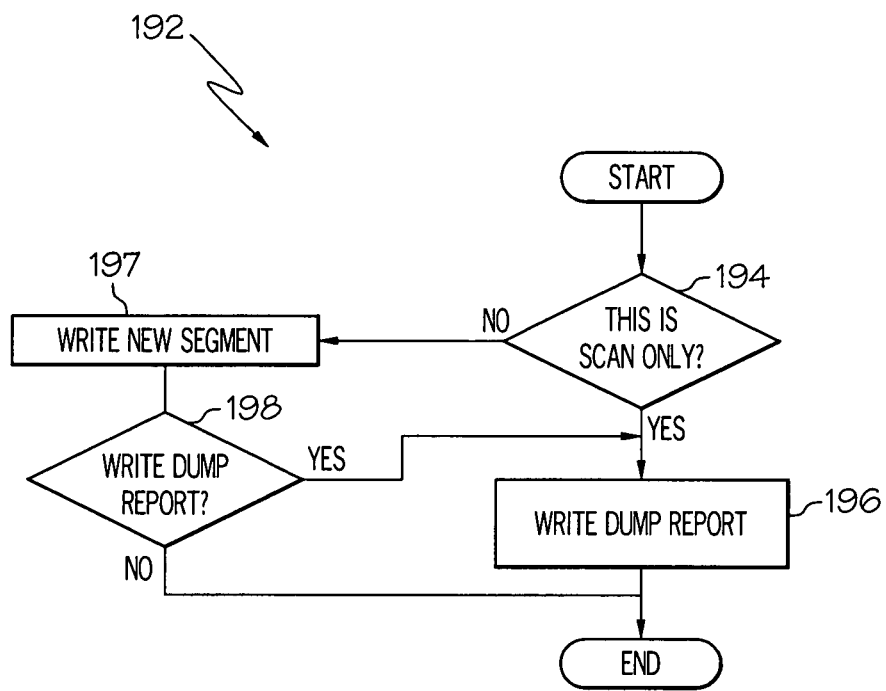
FIG. 7 is a flow chart illustrating an exemplary method for replacing data in a core dump copy and/or writing a report record, which may be implemented as part of the process of FIG. 3.
Figure 11:
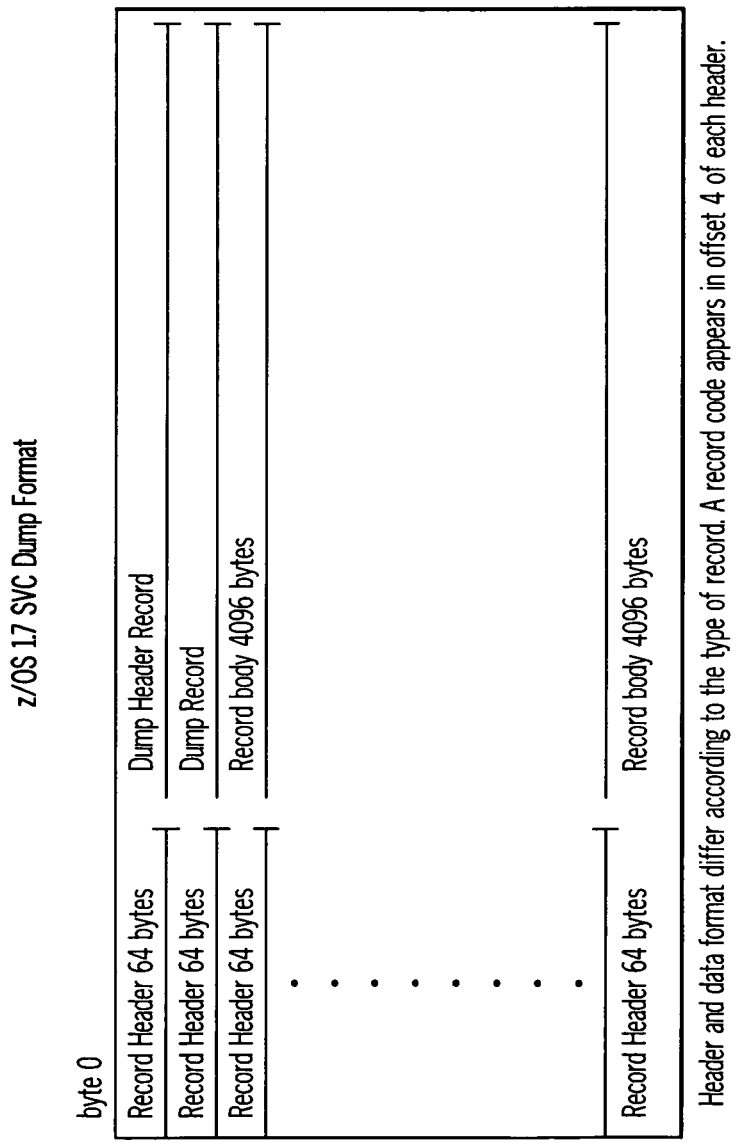
FIG. 11 is an exemplary z/OS dump diagram.

Referring to FIG. 7, a flow illustrates a process for replacing data in a core dump segment and/or writing a dump report record. For example, the method of FIG. 7 may correspond to the end of segment processing at 192 with respect to FIG. 6. A test is performed at 194 by the core dump processing application to see if the current operation is a scan operation, a core dump altering operation, or a core dump altering operation that is to include a corresponding report. If this is a scan only operation, then an appropriate dump record is written to the dump report at 186. If the current operation is a core dump altering operation, the dump segment is written out to the new dump output device at 197, i.e., the copy of the core dump is altered as set out in greater detail herein. A dump report record is written at 196 if a report is requested as determined at 198.

The core dump processing application may be required to handle the individual dump idiosyncrasies of supported operating systems in their OS specific exit. For example, only the specific operating systems dump exit may understand how to match a pattern or string that crosses a page boundary. As an example, a typical z/OS core dump format includes header record(s) followed by records representing pages of memory. In one exemplary format, data is dumped as 4 k pages, i.e., a 4 k range of logical addresses. As such, it may be necessary to the appropriate "end of page processing" in the event that a pattern or string crossed a page boundary to perform the necessary input processing in the exit calls. Other dumps might not have this requirement.

That is, at least a portion of the input parameter processing of the input configuration file, e.g., pattern matching, may be performed in the exit calls. As such, the user input parameters that are processed at 168 described with reference to FIG. 5 may be performed in the exit calls at 156 and 158 described with reference to FIG. 4. For example, in the z/OS operating system, the pattern matching may be performed in the exit and have the exit pass back ranges of dump offsets to the core dump processing application. That is, the main core dump processing application would collect the ranges from all the exits including operating system exits, and optional exits for applications and components like data base software, etc.

These ranges may be sorted, for example, by a monotonically increasing dump offset, conflicts in address ranges may be resolved and indications as to whether the corresponding address is a protected range or a range to be altered, e.g., using the status code or other indicating means may be implemented as described in greater detail herein. Thus, the actual string and pattern searches derived from the input configuration file are embodied in the exits and not in the main program of the core dump processing application as shown in FIG. 5. Rather, the core dump processing application would call exits, and then proceed to process the dump accordingly.

It is possible that a pattern replacement can corrupt areas of the dump if the pattern occurs randomly in part of the dump. However, it is also possible that the modified portion of the dump can be ignored by the service team analyzing the dump because such portions do not fall within critical control blocks. If the pattern replacement results in an unusable dump, the operator may need to rerun the core dump processing application with a modified pattern replacement set in the input configuration file.

A Exemplary Core Dump:

As noted above, there are numerous factors that may trigger a core dump. A standalone core dump may occur, for example, where an operating system fails to boot. The stored data in the core dump can thus be used to determine why the operating system is not starting. In other instances, the operating system is running. However, a component has failed. An example of this later case is illustrated below for the case of an SVC dump.

A z/OS 1.7 MVS high-speed dump (sometimes called an SVCDUMP) is composed of fixed length records of 4160 bytes. Other operating systems may or may not have fixed length records. Therefore, in the general case, a core dump may be treated as a linear string of bytes. However, the core dump processing application could also use an algorithm associated with an operating system exit to determine the start of each logical record as an offset from the first byte of the dump. In the description below, it is assumed that the exit program is specific to z/OS V 1.7 and thus understands that the dump has fixed length records. In z/OS, each record has a 64 byte header. An exemplary header definition is illustrated in FIG. 8.

This example will illustrate one embodiment of the core dump processing application performing an operation on a core dump from a processing device running z/OS. In this example, the core dump processing application is to alter sensitive information belonging to a given address space with address space identification (ASID) X'0032', e.g., by replacing the sensitive information with arbitrary strings of the same length. The expression X'0032' denotes a hexadecimal number whose value is 0032.

Z/OS address spaces are similar to "processes" in other operating systems. An ASID is similar to a process ID (PID). That is, an ASID is a unique numeric identifier for an address space. Z/OS also has a component called UNIX System Services (USS), which assigns PIDs to some address spaces that are designated as running under USS. For the purposes of a simplified example, z/OS PIDs will be ignored.

There are four possible types of dump records that contain address space private storage in a z/OS dump. The four record types are identified based upon the codes CV, DS, SV or SS records. A "CV" code defines an address space private data record. The file in this example contains a multiple virtual storage (MVS) high-speed dump and indicates that virtual main storage owned by one MVS address space dispatched on a designated central processing unit (CPU) is being referenced (CPU ASID). A "DS" code defines a data space private data record. The file contains a MVS high-speed dump and indicates that a data space is being referenced (ASID DSPNAME). An "SS" code defines a data space summary data record. The file contains an MVS high-speed dump and indicates that the portion of a data space represented in summary dump records is being referenced (ASID DSPNAME SUMDUMP). An "SV" code defines an address space summary data record. The file contains an MVS high-speed dump and indicates that the portion of one MVS address space represented in summary dump records is being referenced (ASID SUMDUMP).

Thus, code CV and SV records contain address space storage contents. DS and SS coded records contain Data Space storage contents. A z/OS Data Space is a data only storage area that can be created by an address space. It cannot contain executable programs. Data spaces are often used to extend the amount of virtual storage available to an address space.

Dump records for address space X'0032' will have CV, DS, SV and SS as the address space type code at offset 4 of the dump header as illustrated in FIG. 8. However, not every SVCDUMP will include a Summary Dump. Some address spaces may not have any DS, SV or SS records. Also, sometimes virtual storage that is swapped out or paged out is not dumped. CV records for ASID X'0032' will have X'0032' at offset X'10'. An example of a hexadecimal CV dump record header for address space X'0032' in CDR2 format is illustrated in FIG. 9. Dump records in this example are in hexadecimal binary and Extended Binary-Coded Decimal Interchange (otherwise known as EBCDIC), format. To read the hexadecimal examples, consider the examples as three lines of text. The first line represents a human readable translation of the EBCDIC character (if it is a valid EBCDIC character code). The next two lines contain the hexadecimal equivalent. Each character is composed of two hexadecimal digits read vertically using the second and third lines of text.

Each CV record contains the contents of a 4 k virtual page of storage belonging to the address space whose hexadecimal ASID is at offset X'10'. The logical virtual address of this 4 k of data is 64 bits and starts at X'14' in the dump header. This field is either 31 bits for 32-bit operating systems or 64 bits for 64 bit operating systems. Since this is a CDR2 format record, the address field describes a 64-bit address (doubleword starting at X'14'). In this case, the address is 00000000120BB000 and represents the address in virtual storage of the first byte of this 4 k page.

Some 4 k pages of private storage belonging to this address space may not necessarily have been dumped. Therefore, it is not safe to assume all contiguous pages have been dumped, nor is it safe to assume that dump records are in any particular order in the dump data set. For pattern matching of input parameters, e.g., as specified in the input configuration file, it would be necessary to sort the dump records by logical address to insure that patterns or strings did not cross 4 k page boundaries. However, in this example, no pattern matching is required, since the system is to disguise all data for this address space. If any designated strings or patterns were present in the input data in this example they would be automatically replaced without having to search for them.

In order to overlay all data for this address space in the new copy of the dump data set, it is necessary only to find all records of type CV with the desired ASID in location X'10' and collect the offsets from byte 1 of the dump data set that represent the data starting at offsets 65 through 4160 of this dump record (the first 64 bytes of each record comprise the header). If, in addition, Data Space data is also to be replaced, it is necessary to find the DS records for the given address space. The DS records have the ASID in location (X'A') of the dump record header, followed by the Data Space Name. An example of a DS record for ASID X'0003' is illustrated in FIG. 10.

Similarly, the core dump processing application would consider the offsets from the first byte of the dump data set that correspond to offsets 65 through 4160 in the data space dump records as described for the address space dump records above.

As described in greater detail above, the exit does not actually replace the data belonging to ASID X'0032' in the copy of the core dump. Rather, a parameter table is constructed, wherein a first list of dump data set offset ranges is prepared, in which data is to be replaced, and another list of dump offset ranges is prepared, in which data is to be protected from replacement. In general terms, all dump record headers may be protected, e.g., where the integrity of the dump would be compromised if such headers were altered.

Correspondingly, data belonging to system address spaces may be protected, except for areas containing file buffers of files which were designated as sensitive data. In some cases, system address spaces may also contain other information that is considered sensitive data. All common areas of storage may also be protected, e.g., common areas such as those addressable to all address spaces, containing control blocks and system information.

To continue with the above example, it would be necessary to find the offset ranges for all record contents belonging to ASID X'0032'. The ranges can either be sorted by the operating system exit, by the core dump processing application, or both. As described in greater detail above with reference to FIG. 4, the exit assigns a status code to each range indicating whether it is to be replaced or protected. The replacement of the data by the core dump processing application may require that ranges be sorted, e.g., in ascending order. The core dump processing application could also resolve any overlapping ranges as noted in greater detail above. Similar logic would be necessary for the dump record header offset ranges, which may be marked via the status code as protected.

Continuing with the above example, offsets of data that must be protected may be located in addition to dump record headers. An example thus illustrates how to protect the z/OS System Queue Area storage in the dump data set. Other techniques may be used to find offsets in other parts of the dump. The System Queue Area (SQA) contains critical control blocks that, if overwritten, would destroy the integrity of the dump. The start pointer and length of the SQA are found in a control block called the Global Data Area (GDA) at offset X'90'. This field is named GDASQA. The size of SQA is found at offset X'9C' of the GDA in a field named GDASQASZ.

The GDA address is contained in field CVTGDA located at offset X'230' of the Communication Vector Table (CVT). The CVT address is found at virtual address X'10' in page 0, also known as Prefixed Save Area (PSA). The CVT pointer can be located in the dump data set by searching for a CV dump record with a logical address of all zeroes. Often this record will be the first dump record following the dump header record.

In the dump used in this example, the CVT is at location X'FD62B8' shown in the dump record data area at offset X'10' as follows:

...ÙÂ½
00F6B
00D28

After locating the CVT address in the page 0 record, it is then necessary to search for a dump header with a logical address containing the CVT. Since logical addresses all end in 000 (because they are aligned on a 4 k boundary), one could replace the last three hexadecimal digits of the CVT address with 000 to find a CV record with that logical address. In this example, the record containing the CVT would be found at logical address 0000000000FD6000.

Once the correct CV dump record is located, offset X'230', which contains the address of the GDA, is identified in the CVT. The same procedure is followed to locate offset X'90' of the GDA. Further, the size of SQA and its start address is determined. For example, the offset X'9C' contains the size of the SQA data area.

In this exemplary dump, the GDA is at address X'20E7278" and contains the character string GDA, which is referred to herein as an 'eyecatcher' at the start of the control block. In order to find the GDA, the core dump processing application looks for a dump record with a logical address of 00000000020E7000 in a manner similar to that described with reference to finding the CVT. The data offset X'278' is identified from the start of the data portion of the record for the GDA control block identifier, which is also referred to herein as an eye catcher, then at offset X'308' (GDA+X'90') to find the start address of the system queue area (SQA).

In this case SQA starts at address is X'00E30000' The size of SQA is a 4-byte signed field at X'9C' from the start of the GDA, and in this case is X'1A0000'. The ending address of SQA is determined by adding the size of SQA −1 byte to the start address. In this case the ending address is X'FCFFFF'. All dump records with logical addresses in SQA may now be located. For example, the offsets of the data portion of these dump records may be captured and marked as protected offsets in the dump.

When the exit has completed processing, all ranges of offsets to be protected and all ranges of offsets with data to be replaced are passed to the core dump processing application, e.g., via a parameter table.

The present invention may be practiced on any form of computer system, including a stand alone computer or one or more processors participating on a distributed network of computers. Thus, computer systems programmed with instructions embodying the methods disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

Other computer system configurations can also be employed to perform the method of this invention, and to the extent that a particular system configuration is capable of performing the method of this invention, it is equivalent to the representative computer system and within the scope of this invention.

As will be appreciated by one of skill in the art, the various aspects of the present invention may be embodied as a method, system, or computer program product. Moreover, the various aspects of the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all "means plus function" or "step plus function" elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer implemented method for processing a core dump comprising:
    providing at least one input parameter that corresponds to select information to be identified in said core dump;
    defining address information corresponding to relevant offsets in said core dump, each said relevant offset corresponding to an address where information in said core dump should be protected or an address where information in said core dump may be unprotected; and
    searching said core dump based upon said at least one input parameter and said address information to determine if said select information is located in said core dump at least in said relevant offsets corresponding to information in said core dump that may be unprotected; and
    providing an indication of whether said select information is located in said core dump.

2. The computer implemented method according to claim 1, wherein said providing at least one input parameter that corresponds to select information to be identified in said core dump comprises:
    providing an input configuration file that specifies at least one input parameter as a string, a hexadecimal string or a pattern that defines said select information.

3. The computer implemented method according to claim 1, wherein said providing at least one input parameter that corresponds to select information to be identified in said core dump comprises:
    providing an input configuration file that specifies at least one input parameter as at least one of a file name, a process name or a process identification that defines said select information.

4. The computer implemented method according to claim 1, wherein said providing at least one input parameter that corresponds to select information to be identified in said core dump comprises:
    providing an input configuration file that specifies at least one input parameter as a user identification that defines said select information.

5. The computer implemented method according to claim 1, wherein said defining address information corresponding to relevant offsets in said core dump comprises:
    calling at least one exit program; and
    building a parameter table that comprises relevant address offsets returned by each called exit program.

6. The computer implemented method according to claim 5, wherein said at least one exit program comprises at least one of an operating system exit, a product exit or an application exit.

7. The computer implemented method according to claim 5, wherein said at least one exit is specified in an input configuration file.

8. The computer implemented method according to claim 5, further comprising:
    performing at least one of reading operating system identification data from an input configuration file or executing a command identified in said input configuration file to attempt to identify an operating system that generated said core dump;
    wherein:
    calling at least one exit program comprises calling an operating system exit corresponding to said identified operating system.

9. The computer implemented method according to claim 1, wherein said defining address information corresponding to relevant offsets in said core dump comprises:
    obtaining relevant offset address information provided by an operating system vendor.

10. The computer implemented method according to claim 1, wherein said defining address information corresponding to relevant offsets in said core dump comprises:
    providing an input configuration file that contains at least one rule that defines at least one of an address range that should be protected or an address range that may be unprotected.

11. The computer implemented method according to claim 1, wherein said defining address information corresponding to relevant offsets in said core dump, each said relevant offset corresponding to information in said core dump that should be protected comprises:
    identifying control information for at least one of an operating system, services, processes of software.

12. The computer implemented method according to claim 1, wherein:
    said core dump comprises a core dump copy created from at least a portion of an original core dump;
    further comprising:
    altering each occurrence of said select information located within said core dump copy with predetermined replacement data if said occurrence of said select information is not within a determined offset address that should be protected.

13. The computer implemented method according to claim 12, wherein:

said providing at least one input parameter that corresponds to select information to be identified in said core dump comprises specifying, for at least one input parameter, said predetermined replacement data.

14. The computer implemented method according to claim 12, wherein said predetermined replacement data comprises at least one of a user-specified pattern or a default pattern.

15. The computer implemented method according to claim 1, further comprising:
constructing a parameter table, said parameter table comprising information derived from processing said at least one input parameter that corresponds to select information to be identified in said core dump and said address information corresponding to relevant offsets in said core dump;
wherein:
said searching said core dump based upon said at least one parameter and said address information to determine if said select information is located in said core dump is implemented by processing said information in said parameter table.

16. The computer implemented method according to claim 1, wherein said searching said core dump based upon said at least one parameter and said address information to determine if said select information is located in said core dump comprises:
breaking said core dump down into segments and processing each segment individually.

17. The computer implemented method according to claim 16, wherein said breaking said core dump down into segments and processing each segment individually comprises:
checking for occurrences of said select information across segment boundaries.

18. A system for processing a core dump comprising:
at least one input parameter in a configuration file that corresponds to select information to be identified in said core dump;
a module to define address information corresponding to relevant offsets in said core dump, each said relevant offset corresponding to an address where information in said core dump should be protected or an address where information in said core dump may be unprotected; and
a module to search said core dump based upon said at least one input parameter and said address information to determine if said select information is located in said core dump at least in said relevant offsets corresponding to information in said core dump that may be unprotected; and
a module to provide an indication of whether said select information is located in said core dump.

19. The system according to claim 18, wherein said configuration file specifies at least one input parameter as a string, a hexadecimal string or a pattern that defines said select information.

20. The system according to claim 18, wherein said configuration file specifies at least one input parameter as at least one of a file name, a process name or a process identification that defines said select information.

21. The system according to claim 18, wherein said configuration file specifies at least one input parameter as a user identification that defines said select information.

22. The system according to claim 18, wherein said module to define address information corresponding to relevant offsets in said core dump comprises:
a module to call at least one exit program; and
a module to build a parameter table that comprises relevant address offsets returned by each called exit program.

23. The system according to claim 22, wherein said at least one exit program comprises at least one of an operating system exit, a product exit or an application exit.

24. The system according to claim 22, wherein said at least one exit is specified in said configuration file.

25. The system according to claim 22, further comprising:
a module that either reads operating system identification data from said configuration file or executes a command identified in said input configuration file to attempt to identify an operating system that generated said core dump;
wherein:
said module to call at least one exit program calls an operating system exit corresponding to said identified operating system.

26. The system according to claim 18, wherein said module to define address information corresponding to relevant offsets in said core dump obtains relevant offset address information provided by an operating system vendor.

27. The system according to claim 18, wherein said configuration file contains at least one rule that defines at least one of an address range that should be protected or an address range that may be unprotected.

28. The system according to claim 18, wherein said module to define address information corresponding to relevant offsets in said core dump, each said relevant offset corresponding to information in said core dump that should be protected identifies control information for at least one of an operating system, services, processes of software.

29. The system according to claim 18, wherein:
said core dump comprises a core dump copy created from at least a portion of an original core dump;
further comprising:
a module to alter each occurrence of said select information located within said core dump copy with predetermined replacement data if said occurrence of said select information is not within a determined offset address that should be protected.

30. The system according to claim 29, wherein:
at least one input parameter that corresponds to select information to be identified in said core dump specifies, for at least one input parameter, said predetermined replacement data.

31. The system according to claim 29, wherein said predetermined replacement data comprises at least one of a user-specified pattern or a default pattern.

32. The system according to claim 18, further comprising:
a module to construct a parameter table, said parameter table comprising information derived from processing said at least one input parameter that corresponds to select information to be identified in said core dump and said address information corresponding to relevant offsets in said core dump;
wherein:
said module to search said core dump based upon said at least one parameter and said address information to determine if said select information is located in said core dump processes said information in said parameter table.

33. The system according to claim 18, wherein said module to search said core dump based upon said at least one parameter and said address information to determine if said select information is located in said core dump breaks said core dump down into segments and processing each segment individually.

34. The system according to claim 33, wherein a check is performed for occurrences of said select information across segment boundaries.

35. A computer program product to process a core dump comprising:
a non-transitory computer usable medium having computer usable program code embodied therewith, the computer usable program code comprising:
computer usable program code configured to store at least one input parameter in a configuration file that corresponds to select information to be identified in said core dump;
computer usable program code configured to define address information corresponding to relevant offsets in said core dump, each said relevant offset corresponding to an address where information in said core dump should be protected or an address where information in said core dump may be unprotected; and
computer usable program code configured to search said core dump based upon said at least one input parameter and said address information to determine if said select information is located in said core dump at least in said relevant offsets corresponding to information in said core dump that may be unprotected; and
computer usable program code configured to provide an indication of whether said select information located in said core dump.

36. The computer program product according to claim 35, wherein said configuration file specifies at least one input parameter as a string, a hexadecimal string or a pattern that defines said select information.

37. The computer program product according to claim 35, wherein said configuration file specifies at least one input parameter as at least one of a file name, a process name or a process identification that defines said select information.

38. The computer program product according to claim 35, wherein said configuration file specifies at least one input parameter as a user identification that defines said select information.

39. The computer program product according to claim 35, wherein said computer usable program code configured to define address information corresponding to relevant offsets in said core dump comprises:
computer usable program code configured to call at least one exit program; and
computer usable program code configured to build a parameter table that comprises relevant address offsets returned by each called exit program.

40. The computer program product according to claim 39, wherein said at least one exit program comprises at least one of an operating system exit, a product exit or an application exit.

41. The computer program product according to claim 39, wherein said at least one exit is specified in said configuration file.

42. The computer program product according to claim 39, further comprising:
a module that either reads operating system identification data from said configuration file or executes a command identified in said input configuration file to attempt to identify an operating system that generated said core dump;
wherein:
said computer usable program code configured to call at least one exit program calls an operating system exit corresponding to said identified operating system.

43. The computer program product according to claim 35, wherein said computer usable program code configured to define address information corresponding to relevant offsets in said core dump obtains relevant offset address information provided by an operating system vendor.

44. The computer program product according to claim 35, wherein said configuration file contains at least one rule that defines at least one of an address range that should be protected or an address range that may be unprotected.

45. The computer program product according to claim 35, wherein said computer usable program code configured to define address information corresponding to relevant offsets in said core dump, each said relevant offset corresponding to information in said core dump that should be protected identifies control information for at least one of an operating system, services, processes of software.

46. The computer program product according to claim 35, wherein:
said core dump comprises a core dump copy created from at least a portion of an original core dump;
further comprising:
computer usable program code configured to alter each occurrence of said select information located within said core dump copy with predetermined replacement data if said occurrence of said select information is not within a determined offset address that should be protected.

47. The computer program product according to claim 46, wherein:
at least one input parameter that corresponds to select information to be identified in said core dump specifies, for at least one input parameter, said predetermined replacement data.

48. The computer program product according to claim 46, wherein said predetermined replacement data comprises at least one of a user-specified pattern or a default pattern.

49. The computer program product according to claim 35, further comprising:
computer usable program code configured to construct a parameter table, said parameter table comprising information derived from processing said at least one input parameter that corresponds to select information to be identified in said core dump and said address information corresponding to relevant offsets in said core dump;
wherein:
said computer usable program code configured to search said core dump based upon said at least one parameter and said address information to determine if said select information is located in said core dump processes said information in said parameter table.

50. The computer program product according to claim 35, wherein said computer usable program code configured to search said core dump based upon said at least one parameter and said address information to determine if said select information is located in said core dump breaks said core dump down into segments and processing each segment individually.

51. The computer program product according to claim 50, wherein a check is performed for occurrences of said select information across segment boundaries.

* * * * *